Aug. 18, 1970     S. K. ROY     3,524,341

PORE DETERMINATION OF A POROUS MEMBER

Filed Aug. 5, 1968     3 Sheets-Sheet 1

INVENTOR.

SALIL K. ROY

*Sheldon H Parker*

United States Patent Office 3,524,341
Patented Aug. 18, 1970

3,524,341
PORE DETERMINATION OF A POROUS MEMBER
Salil K. Roy, New Brunswick, N.J., assignor to American Standard Inc., New York, N.Y., a corporation of Delaware
Filed Aug. 5, 1968, Ser. No. 750,231
Int. Cl. G01n 15/08
U.S. Cl. 73—38    7 Claims

ABSTRACT OF THE DISCLOSURE

This invention relates to the method and apparatus of determining pore characteristics by measuring impedance through and differential pressure across a porous sample. The method involves applying a conductive metal coating to opposing surfaces of a porous member which is then filled with a conductive fluid. A gas under pressure is applied to the member and the pressure drop of the gas through the specimen together with the impedance of the specimen between the coated opposing surfaces is obtained. The measured pressure and impedance values are used to determine the porosity of the specimen. The apparatus comprises two chambers, a specimen, the porosity of which is to be determined being positioned between the two chambers. The first chamber is coupled to receive a gas under pressure. A manometer is interposed between the first and second chambers to measure the pressure differential between the chambers, and an impedance measuring device is used to measure the impedance across the specimen.

This invention relates generally to porosimeters and more specifically to the measurement of pore size distribution, path length and inactive porosity of porous structures.

A determination of pore size distribution is important when working with porous materials. A knowledge of the size distribution of pores permits the calculation of permeation rates of fluids. Pore size distribution information also makes it possible to estimate the surface area of porous materials.

To maintain efficiency in a filtration process, it is important that the diameter of the smallest particle present in the filterable material be larger than that of the largest pore. Here again, a knowledge of the pore size distribution is required.

In refractory and refractory coated materials, the corrosion rate is usually dependent on whether the corrodent can penetrate the pores. In many instances it appears that the pore size is as important as the interfacial energies and the contact angle of the corrodent and the refractory as well as the reactivity of the two.

Higher permeation rates are obtained with larger pores. However, larger pores also result in larger bubbles and hence a smaller surface area of bubbles with a given amount of gas. However, very small pores are more susceptible to being plugged by impurities in the gas and hence, a compromise is required for most efficient use. Here again, a pore size distribution determination becomes necessary.

In a ceramic material, in most instances, pores are not usually uniform. Often, assumptions are made regarding shape; and, the situation is quite complicated due to the existence of tortuosity, inert and inactive porosity and interconnection of pores.

It is an object of this invention to provide a new and improved method of determining pore size.

It is another object of this invention to provide a device which measures pores in porous ceramics which are open on both sides.

It is also an object of this invention to provide a new method which is quick, simple and accurate.

It is still another object of this invention to provide a device which is economical to build and reliable in operation.

Other objects and many of the attendant advantages of this invention will be readily appreciated as the apparatus becomes better understood by reference to the following detailed description when considered in connection with the accompanying drawings wherein.

Similar reference numbers refer to similar parts throughout the several views.

Figure 1:
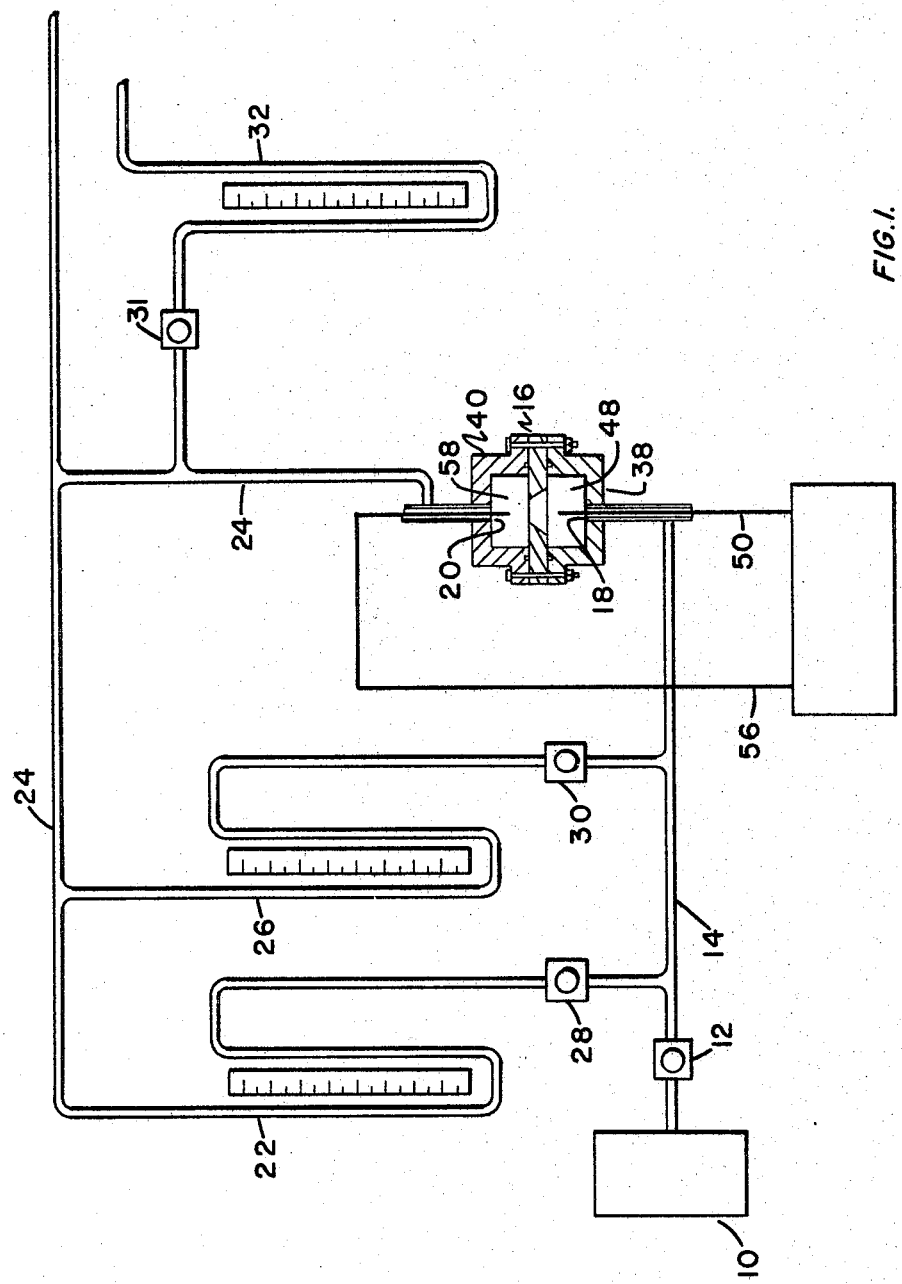
FIG. 1 is a schematic of structure in accordance with the principles of this invention.

Referring to FIG. 1, there is illustrated a structure in accordance with the principles of the invention. A source of gas pressure 10 such as a commercially available cylinder of gas or the like is coupled to feed gas through a valve 12 to a high pressure gas line 14. The valve 12 controls selectively the pressure of the gas in gas line 14 from the source of gas pressure 10. A specimen retaining means 16 which supports the sample whose pore size is to be determined has a high pressure inlet port 18 and a low pressure outlet port 20. The gas line 14 is coupled to feed gas to the high pressure inlet port 18.

A low pressure differential gas measuring means 22 such as a water manometer is coupled between the high pressure inlet port 18 through the gas line 14 and the low pressure outlet port 20 through gas line 24.

A high pressure differential gas measuring means 26 such as a mercury manometer is coupled between the high pressure inlet port 18 through the gas line 14 and the low pressure outlet port 20 through the gas line 24.

Thus, both the low and high pressure differential gas measuring means 22, 26 are connected to measure the differential of pressure in the specimen retaining means 16.

A valve 28 is interposed between the gas line 14 and the low pressure differential measuring means 22 to selectively permit or prevent the pressure of the gas in the gas line 24 from affecting the measuring means 22.

Similarly, a valve 30 is interposed between the gas line 14 and the low pressure differential measuring means 26 to selectively permit or prevent the pressure of the gas in the gas line 24 from affecting the measuring means 26.

Another high pressure differential gas measuring means 32 such as a mercury manometer is coupled between the low pressure outlet port 20 through the gas line 24 and the atmosphere.

A valve 31 is interposed between the line 24 and the pressure differential gas measuring means 32 to selectively permit the means 32 to measure the pressure differential between the line 24 and the atmosphere.

Figure 2:
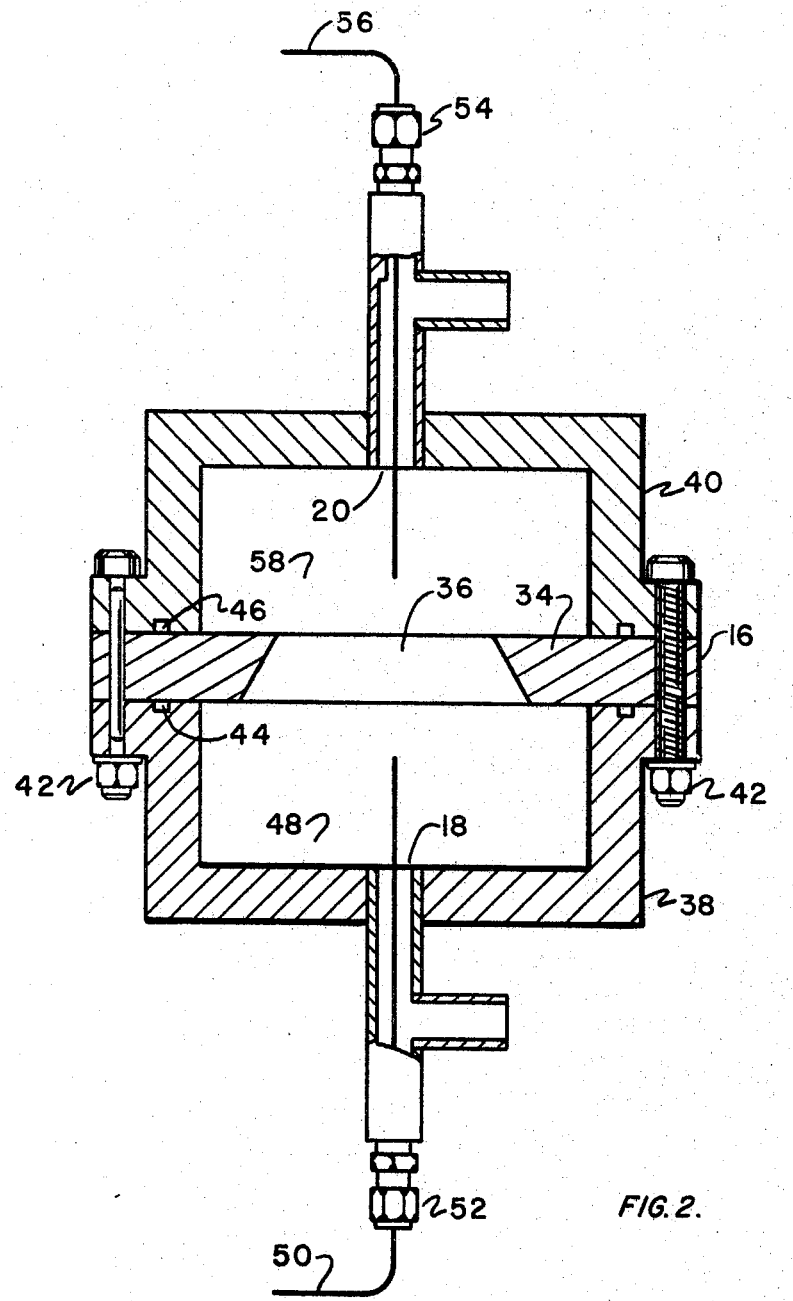
FIG. 2 is a sectional view of the sample supporting part of FIG. 1.

Referring to FIG. 2, there is illustrated a sectional view of the specimen retaining means 16. A centrally positioned plate 34 having a cutout 36 which can be tapered is positioned between a high pressure cover plate 38 which can be cup shaped; and a low pressure cover plate 40 which can also be cup shaped.

The centrally positioned plate 34 is positioned between the high pressure cover plate 38 and the low pressure cover plate 40; and the assemblage is removably clamped together by positive but quick disconnect means such as bolts and nuts 42 or the like. O rings 44, 46 or the like are interposed between each cover plate 38, 40 and the associated contacting surface of the centrally positioned plate 34 to provide a gas tight seal.

The high pressure inlet port 18 is coupled to feed gas from the gas line 14 to the high pressure cavity 48 of the cover plate 38. An electrical conductor 50 which extends from the exterior of the high pressure cover plate 38 to the interior of the cover plate 38 passes through a fitting 52 coupled to the cover plate 38. The fitting 52 which can be selectively secured about the conductor to be positioned a desired distance within the high pressure cavity 48.

The low pressure outlet part 20 is coupled to permit gas to pass from the low pressure cavity 58 of the cover plate 40 to the gas line 24.

In a similar manner, an electrical conductor 56 extends from the exterior of the low pressure cover plate 40 to the interior of the cover plate 40 through a fitting 54 coupled to the cover plate 40. The fitting which can be selectively secured about the conductor 56 to provide a gas tight seal permits the conductor to be selectively positioned a desired distance within the low pressure cavity 58.

The ends of the conductors 50, 56 can be coated with platinum to reduce the effect of corrosive action of the solution which impregnates the sample.

In the specimen retaining means 16, the centrally positioned plate 34 and the high and low pressure cover plates 38, 40 are made of non-conducting material such as Plexiglass or the like.

In operation, a porous sample approximately 5 cm. in diameter and 1 cm. in thickness the pore size distribution of which is to be determined is coated by any one of a number of methods with a metal to make the surface conducting. The application of a thin film of gold by the vapor deposition technique was found to give good results. The thickness of the film is negligible compared to the diameter of the pores.

The sample with the metal deposit on it is placed into an evacuation chamber at a pressure of only a few microns for approximately one hour. All the air from the pores is thus removed. While the sample is still under vacuum, an electrolytic solution such as 0.1 N KCl is poured onto and covers completely the sample. The vacuum is then released and the sample is left immersed for a time sufficient to permit it to become impregnated with the electrolytic solution. A few minutes was found to be adequate.

There are various methods of saturating samples with an electrolyte such as soaking in a solution at room temperature; heating the sample while in an electrolyte solution; and evacuating and then impregnating the sample with an electrolyte solution at room temperature. However, the last noted procedure appears to be most satisfactory as replacement of the air in the pores of the sample with the solution takes place in successive stages and maximum impregnation of the sample with the solution is possible.

The metal coated and eletcrolyte impregnated sample is mounted onto the centrally positioned plate 34 in a gas tight manner by means of clay, wax or the like. The specimen retaining means 16 is assembled, the low and high pressure cover plates being positioned on each side of the centrally positioned plate 34. The electrical conductors 50, 56 are positioned to contact the opposite surfaces of the sample and the specimen retaining means 16 is made gas tight by securing the clamping means such as the bolts and nuts 42 and the fittings 52, 54.

An impedance bridge which accurately measure resistance is coupled to the leads 50, 56 to measure the resistance of the sample. In those instances where a 1 kc. source is used with the impedance bridge to measure the ohmic resistance of the sample, the capacitance of the sample should be balanced before taking readings.

Initially, the resistance of the sample is measured and noted. The valve 12 is opened slightly to increase the gas pressure within the high pressure cavity 48 of the specimen retaining means 16 and the resistance across the sample is again measured. The pressure to the high pressure cavity 48 and, therefore, the pressure across the sample is increased in steps and the resistance across the sample is measured for each pressure differential. The first change (increase) of resistance indicates the clearing of the largest diameter pores. As the pressure is further increased, the smaller diameter pores are also cleared. When the smallest diameter pores are cleared, the resistance rises sharply to a very high value. Depending upon the nature of the specimen, different resistance vs. pressure difference curves can be obtained.

Figure 3:
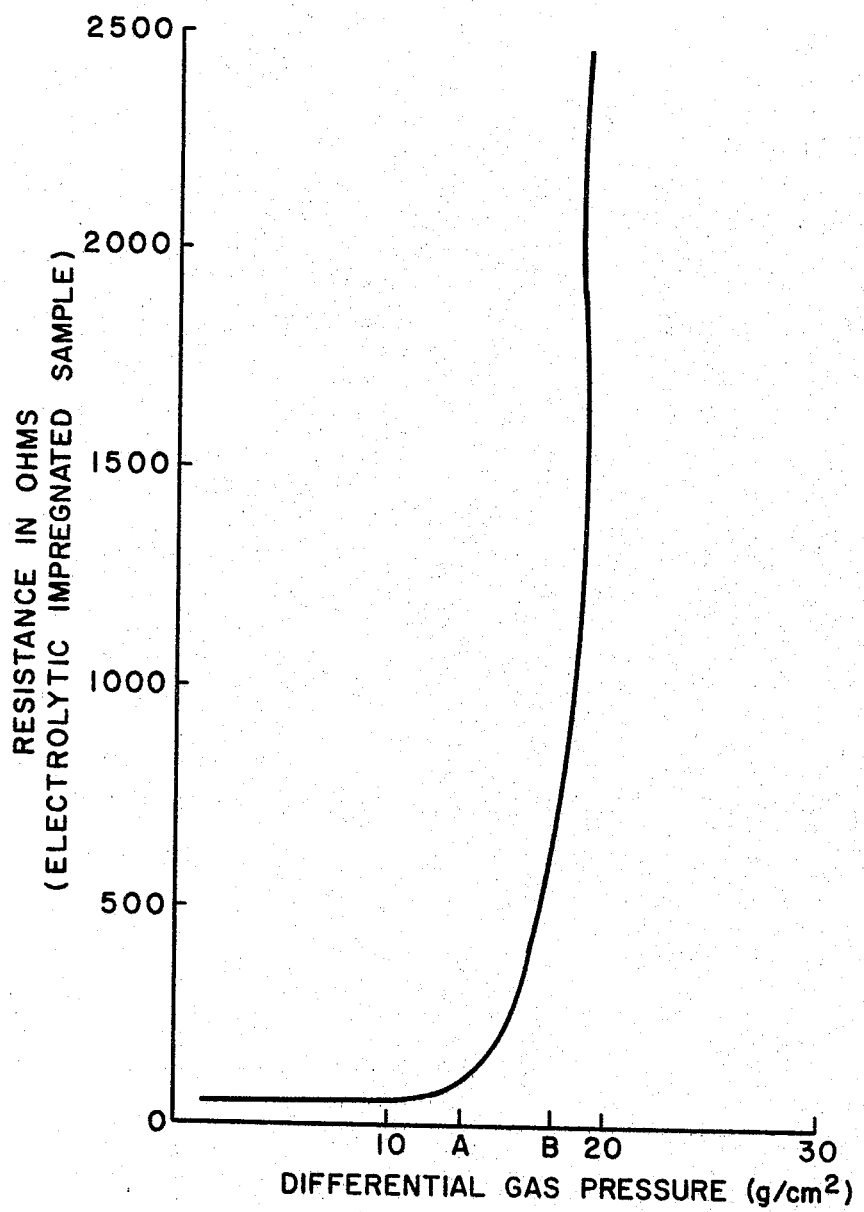
FIG. 3 is typical of a curve obtained when determining pore size in a porous ceramic with the structure of FIG. 1.

The curve of FIG. 3 is that of electrical resistance of an electrolyte impregnated sample vs. differential gas pressure for a sample tested.

To remove a liquid from a capillary having diameter D, the pressure of gas must exceed the pressure P represented by $$P = \frac{4\gamma \cos \phi}{D}$$

where:

$\gamma$ = surface tension of the liquid
$\phi$ = angle of contact

Where a 0.1 N KCl soultion is used as the electrolytic solution impregnated into the sample, the formula becomes $$P = 3000/D$$

Where P is in grams per square centimeters and D is in microns.

Transposing, $$D = 3000/P$$

Referring again to FIG. 3, it can be seen that the first significant rise in resistance occurred at point A (differential pressure of 14); and, that a dramatic increase in resistance occurred at point B (differential pressure of 18).

Substituting these two values into the equation last written, it can be quickly determined that most of pores in the sample are in the size range from 214 microns to 167 microns.

Conductance is the reciprocal of resistance and the diameter of a pore is inversely proportional to pressure difference. Therefore, the nature of the resistance vs. pressure difference curves is similar to the conductance vs. diameter curves. If a small size range is defined by an equivalent size, the conductance due to an equivalent capillary can be calculated. By measuring the difference in conductance between two given points of the conductance vs. diameter curve and comparing the obtained value with the estimated value for the equivalent capillary, the number of capillaries of that size can be determined. This can be stated as follows:

$$n = \Delta C / C_{cal}$$

where:

$n$ = number of capillaries/cm.$^2$;
$\Delta C$ = difference in conductance between two given diameters; and
$C_{cal}$ = calculated conductance due to one pore of equivalent diameter.

If desired, the method of curve fitting can also be used.

If desired, the active and inactive porosity can be obtained and, therefore, the impermeable pores can be separated from the permeable pores.

The resistance of a porous sample being tested which is saturated with an electrolyte can be represented by $$R_1 = \frac{R_s(l_e)^2}{bdl(P-P_1-P_2)} \quad (1)$$

where:
$b$, $d$ and $l$ are the dimensions of the specimen;
$P$ is the porosity;
$P_1$ is the closest porosity;
$P_2$ is the open but inert fractional porosity;
$l_e$ is the average extended path of the pores; and
$R_s$ is the specific resistance of the electrolyte.

If $R_o$ is the electrical resistance of a column of electrolyte of the same size as the sample being tested, then $$R_o = \frac{R_s l}{bd} \quad (2)$$

Dividing Equation 1 by 2; rearranging and taking the square root of each side produces $$\frac{l_e}{l} = \sqrt{\frac{R_1}{R_o}(P-P_1-P_2)} \quad (3)$$

If the sample is partially saturated with the electrolyte and if the degree of saturation defined by the ratio of the amount of electrolyte in the partially saturated to the completely saturated sample is expressed by $\lambda$, the resistance of the unsaturated sample $R_\lambda$ can be represented by $$R_\lambda = \frac{R_s(l_e)^2}{lbd[\lambda(P-P_1)-P_2]} \quad (4)$$

Now, dividing Equation 4 by Equation 2; then rearranging and, thereafter, taking the square root of both sides produces $$\frac{l_e}{l} = \sqrt{\frac{R_\lambda}{R_o}[\lambda(P-P_1)-P_2]} \quad (5)$$

Now, dividing Equation 4 by Equation 1 and, thereafter rearranging produces $$\frac{P_2}{P-P_1} = \frac{\left(\frac{R_\lambda}{R_1}\right)\lambda - 1}{\frac{R_\lambda}{R_1} - 1} \quad (6)$$

The above treatment of the electrical resistance includes all of the porosity and can be used for test bodies having both open and closed pores.

Determination of bulk density $d_d$ and true density $d_t$ permits the determination of the total porosity $P$ with $$P = 1 - \left(\frac{d_b}{d_t}\right) \quad (7)$$

If the open porosity is known, the closed pores $P_1$ can be obtained. By measuring the electrolytic resistance of a completely saturated sample and a partially unsaturated sample, $P_2$ can be determined. Hence, the inactive porosity ratios $$\frac{P_1}{P}; \frac{P_2}{P}; \frac{P_1+P_2}{P} \text{ and } \frac{P_2}{P-P_1}$$

can be obtained.

Following are values of porosity ratios, tortuosity and Archie's coefficient of light weight alumina ceramics where the members 1 through 9 in the first column represent samples containing increasing amount of bond.

| No. | $P=1-d_b/d_t$ total porosity | $P_{open}=P-P_1$ | $P_1$=closed pores | $P_2$=open but inactive | Inert porosity ratios | | | | $F=R_1/R_0$ | $\frac{R_1/R_0}{(P-P_1)}$ | $\sqrt{\frac{R_1/R_0}{(P-P_1)}}$ | $\sqrt{\frac{R_1/R_0}{(P-P_1-P_2)}}$ |
| --- | --- | --- | --- | --- | --- | --- | --- | --- | --- | --- | --- | --- |
| | | | | | $P_1/P$ | $P_2/P$ | $P_1+P_2/P$ | $P_2/P-P_1$ | | | | |
| 1 | .650 | .641 | .008 | .319 | .012 | .492 | .503 | .497 | 5.189 | 3.329 | 1.825 | 1.288 |
| 2 | .628 | .599 | .029 | .336 | .046 | .535 | .581 | .560 | 5.553 | 3.327 | 1.825 | 1.368 |
| 3 | .599 | .506 | .093 | .245 | .155 | .410 | .564 | .484 | 7.204 | 3.649 | 1.911 | 1.330 |
| 4 | .560 | .461 | .099 | .233 | .176 | .416 | .593 | .506 | 8.162 | 3.765 | 1.939 | 1.378 |
| 5 | .544 | .437 | .107 | .229 | .196 | .422 | .618 | .525 | 9.228 | 4.033 | 2.008 | 1.456 |
| 6 | .531 | .426 | .104 | .242 | .197 | .457 | .654 | .569 | 10.941 | 4.664 | 2.159 | 1.628 |
| 7 | .514 | .446 | .068 | .272 | .132 | .530 | .662 | .611 | 11.544 | 5.147 | 2.269 | 1.772 |
| 8 | .471 | .365 | .106 | .248 | .226 | .526 | .752 | .680 | 26.663 | 9.727 | 3.119 | 2.571 |
| 9 | .478 | .375 | .103 | .230 | .215 | .480 | .695 | .611 | 14.737 | 5.532 | 2.352 | 1.839 |

Obviously many modifications and variations of the present invention are possible in the light of the above teachings. It is, therefore, to be understood that the invention may be practiced otherwise than as specifically described.

What is claimed is:

1. Method for determining pore characteristics of a porous structure comprising the steps of applying a conductive coating to opposing surfaces of a porous member; filling the pores of said porous member with a conductive fluid; applying a gas under pressure to one of the coated surfaces of said porous member; measuring the pressure drop of the gas through the porous member; measuring the impedance across the porous member; and, determining the porosity of the porous member from the measured pressure and impedance.

2. The method of claim 1 wherein the step of applying a conductive coating to opposing surfaces of a porous member comprises depositing a thin film of gold by vapor deposition.

3. The method of claim 2 wherein the step of filling the pores of said porous member with a conductive fluid comprising filling said pores with an electrolytic solution of 0.1 N KCl.

4. The method of claim 1 wherein filling the pores of said porous member with a conductive fluid comprises surrounding said porous member with a vacuum, covering said porous member with the conductive fluid, and releasing said vacuum.

5. The method of claim 4 wherein the vacuum surrounding said porous member is less than 10 microns.

6. The method of claim 5 wherein said porous member is surrounded by the vacuum of less than 10 microns for more than one-half an hour.

7. A device for determining pore characteristics of a porous structure specimen comprising means to support said specimen between a first chamber and a second chamber, means to feed a gas under pressure to said first chamber, a water manometer coupled to measure the pressure differential between said first chamber and said second chamber, a mercury manometer coupled to measure the pressure differential between said first chamber and said second chamber, valve means to selectively couple said water manometer and said mercury manometer to measure the pressure differential across said first and second chambers, impedance measuring means to measure the impedance across said specimen, and means to selectively control the pressure of the gas under pressure fed to said first chamber.

References Cited
UNITED STATES PATENTS

| | | | |
|---|---|---|---|
| 1,318,473 | 5/1965 | Hoffmann | 73—401 |
| 2,539,355 | 1/1951 | Reichertz | 73—38 |
| 2,705,418 | 4/1955 | Reichertz et al. | 73—38 |
| 2,724,963 | 11/1955 | Brink | 73—38 |
| 2,942,176 | 6/1960 | Brownscombe et al. | 73—38 XR |
| 3,301,043 | 1/1967 | Lyssy | 73—38 |
| 3,349,619 | 10/1967 | Millar | 73—205 |
| 3,371,519 | 3/1968 | Slone et al. | 73—38 |

FOREIGN PATENTS

| | | |
|---|---|---|
| 201,753 | 11/1967 | U.S.S.R. |

LOUIS R. PRINCE, Primary Examiner

W. A. HENRY II, Assistant Examiner